Patented Feb. 19, 1935

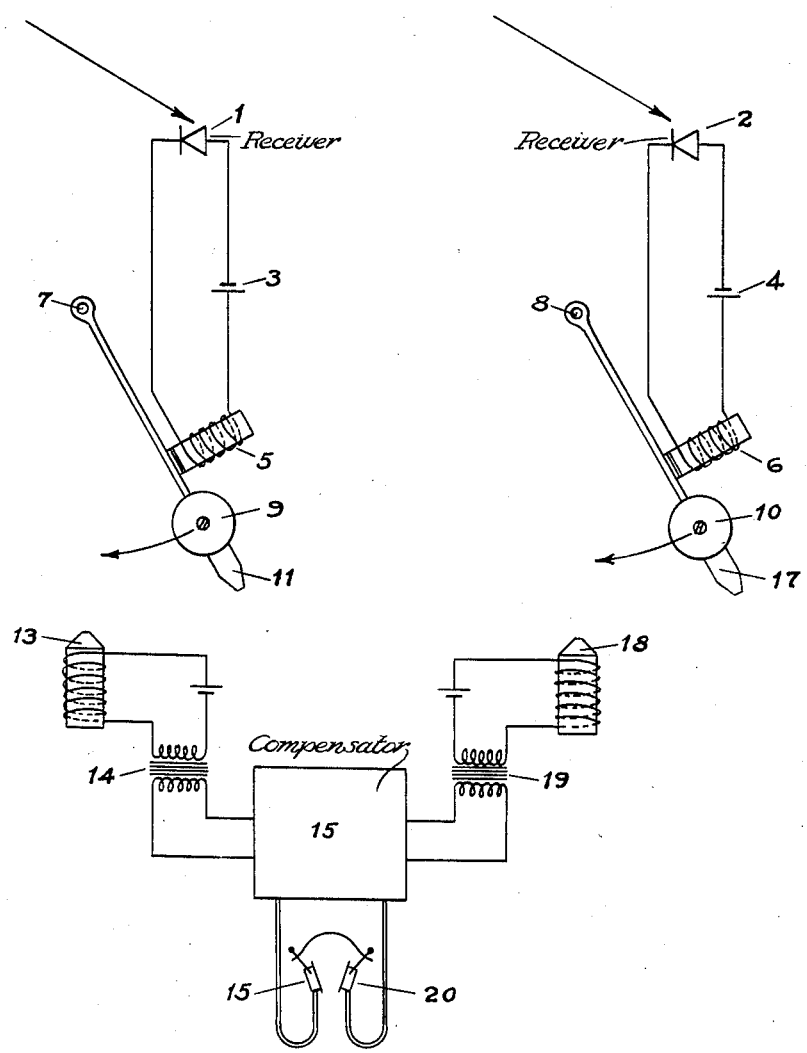

1,991,396

UNITED STATES PATENT OFFICE 1,991,396

METHOD AND APPARATUS FOR MEASURING TIME INTERVALS

Willy Kunze, Bremen, Germany, assignor to Submarine Signal Company, Boston, Mass., a corporation of Maine Application February 24, 1930, Serial No. 430,930
In Germany March 7, 1929

4 Claims. (Cl. 177—386)

The present invention concerns the measurement of short time intervals, especially of the interval happening between two events which are not repeated.

In this case a common method of making such measurements is by recording on a moving tape the instants of the occurrence of the events and determining the time interval by noting the speed of the tape and the distance on the tape between the two records. Such measurements have, in the past, been made by photographically recording on a sensitive film the occurrence and measuring the distance between the records, knowing the velocity of the film.

Where it is possible to have a repetition of events in some definite sequence, measurements have been made by observing the difference of phase between the two successions of events to be measured. Such measurements are often made by the use of an oscillograph or some other phase measuring device or by a compensator. In each case, however, the event must be repeated.

It often happens, however, that the event is not repeated. For instance, in the location of a source of sound, as for example the position of a gun which is being fired, the sound of one shot may come to the notice of the listener and it may be necessary by this shot to detect and locate the position of the gun. In the past the position has sometimes been determined by the use of a compensator and the binaural method of determining direction, the compensator being connected to sound receivers located at different points to compensate for the time difference between the arrival of the sounds at these points. This has been difficult, however, because the sound had gone by before the compensator could be adjusted, and all that remained was the impression that it was to the right or left.

In the present system, the relation of the sound arriving at the two receivers has been preserved and periodically reproduced so that the listener can leisurely make his observation and obtain extremely accurate results.

The present invention may take the form of various embodiments and be carried out in a number of different ways. In the annexed drawing is shown schematically one embodiment of the invention.

Two instruments 1 and 2 are provided for receiving the record of the events between which the time interval is to be measured. These are indicated in the drawing as microphonic contact devices. Each of these devices is in a series circuit with a battery and a holding magnet, the battery 3 and the magnet 5 being connected with the microphone 1, while the battery 4 and the magnet 6 are connected with the microphone 2.

The holding magnets 5 and 6 control respectively the vibrating systems 9 and 10 which, as shown in the drawing, are pendulums, and release these systems immediately upon the receipt of the signals at the microphones, which action breaks the circuit or weakens the current in the holding magnets.

Magnetically associated with the pendulums 9 and 10 are the inductances 13 and 18 respectively, by which the armatures 11 and 17 swing when the pendulums are released. The armatures 11 and 17 swinging by the inductances 13 and 18 respectively vary the current in the transformers 14 and 19. The listener listening through the head telephones 16 and 20 is able to hear this sound caused by the periodic swing of the pendulums and can adjust the compensator 15 which may be of the type shown in Patent No. 1,622,594, patented March 29, 1927, or shown in Patent No. 1,682,712, patented August 28, 1928, until the sounds heard through the transformer 14 coincide with those heard through the transformer 19.

It should be noted that magnets 5 and 6 are only holding magnets which means that considerably less current is used in holding the oscillating systems to the magnets than in attracting them. After the vibrating systems are free from the magnets, the successive amplitudes of motion being less even though the circuit through the receivers 1 and 2 is restored, the magnets will not pick up and hold the vibrating system. The pendulums 9 and 10 will therefore continue to oscillate and allow sufficient oscillations to make the necessary measurements.

In this manner, even though the signal has passed, since the phase relation has been preserved, the observer can obtain a definite impression and determine the time difference.

If the device is applied to the location of sound, the listener can obtain a definite impression of direction by using the compensator 15 to produce a central binaural image. The amount of adjustment of the compensator in bringing the impulses into the same time coincidence gives a measure of the desired time interval.

The invention having been described, what is claimed is:

1. A system for measuring the time interval between the happening of two events comprising separate means for receiving indications of the happening of each event, means controlled thereby for releasing periodic oscillating systems, and means for measuring the difference of phase between said systems.

2. A system for measuring the time interval between the happening of two events comprising separate means for receiving indications of the happening of each event, a plurality of oscillating systems operated by said separate means, and a compensator for measuring the phase difference between said oscillating systems.

3. A method of measuring short time intervals between the happening of unique events which consists in allowing said events each to set in motion a periodic system having the same frequency and measuring the time interval by measuring the phase difference between the systems.

4. A method of measuring short time intervals between the occurrence of two or more unique events which comprises setting in motion a periodic system at the instant of the happening of each of said events, all of said periodic systems having the same periodicity, measuring the phase difference existing between said systems, and thereby determining the short time interval.

WILLY KUNZE.